United States Patent
Nakamura

(10) Patent No.: US 12,545,186 B2
(45) Date of Patent: Feb. 10, 2026

(54) DISPLAY CONTROL DEVICE

(71) Applicant: Faurecia Clarion Electronics Co., Ltd., Saitama (JP)

(72) Inventor: Junya Nakamura, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 105 days.

(21) Appl. No.: 18/212,626

(22) Filed: Jun. 21, 2023

(65) Prior Publication Data

US 2024/0001850 A1     Jan. 4, 2024

(30) Foreign Application Priority Data

Jun. 29, 2022    (JP) ................................. 2022-104669

(51) Int. Cl.
*B60R 1/24*     (2022.01)
*B60R 11/02*     (2006.01)
*B60R 11/00*     (2006.01)

(52) U.S. Cl.
CPC ............ *B60R 1/24* (2022.01); *B60R 11/0235* (2013.01); *B60R 2011/0022* (2013.01);
(Continued)

(58) Field of Classification Search
CPC .............. B60R 1/24; B60R 11/0235; B60R 2011/0022; B60R 2011/0288; B60R 2300/301; B60R 2300/802; B60R 2300/8033; B60R 2300/8093; B60R 2300/8026; B60R 1/25; B60R 2300/202; G08G 1/166; G08G 1/167
See application file for complete search history.

(56) References Cited

U.S. PATENT DOCUMENTS

| | | | |
|---|---|---|---|
| 8,345,095 B2 | 1/2013 | Oizumi | |
| 10,981,507 B1 * | 4/2021 | Benjamin | ............. B60Q 9/008 |

(Continued)

FOREIGN PATENT DOCUMENTS

| | | |
|---|---|---|
| CN | 109305105 A | 2/2019 |
| EP | 1939040 A2 | 7/2008 |

(Continued)

OTHER PUBLICATIONS

JP 2020033003 A English Translation (Year: 2020).*
(Continued)

*Primary Examiner* — Kito R Robinson
*Assistant Examiner* — Alexander V Gentile
(74) *Attorney, Agent, or Firm* — Tucker Ellis LLP

(57) ABSTRACT

A display control device includes a processor; and a non-transitory computer-readable medium having stored thereon executable instructions that, when executed by the processor, cause the display control device to function as: an obstacle identifying part that identifies an obstacle area; a driver information acquiring part that acquires driver information; a blocked area identifying part that identifies a blocked area based on driver information; a blocked area ratio calculating part that calculates a blocked area ratio; and a display controlling part that controls the image on the displaying part. The display controlling part is configured to display a driver's point of view image obtained by converting a viewpoint of the image captured by the imaging part based on the driver information when the blocked area ratio equals to a predetermined value or higher; and not to display it when the blocked area ratio is less than the predetermined value.

5 Claims, 9 Drawing Sheets

(52) U.S. Cl.
CPC . *B60R 2011/0288* (2013.01); *B60R 2300/301* (2013.01); *B60R 2300/802* (2013.01); *B60R 2300/8033* (2013.01); *B60R 2300/8093* (2013.01)

(56) References Cited

U.S. PATENT DOCUMENTS

| | | | |
|---|---|---|---|
| 2011/0090073 | A1 | 4/2011 | Ozaki |
| 2015/0002642 | A1* | 1/2015 | Dressler .................. B60R 1/23 348/51 |
| 2017/0267176 | A1* | 9/2017 | Hoyda .................. G08G 1/167 |
| 2018/0118144 | A1* | 5/2018 | Yoshihira ............... G08G 1/167 |
| 2019/0031102 | A1 | 1/2019 | Kishimoto |
| 2021/0323484 | A1* | 10/2021 | Jeong .................. B60R 11/0235 |
| 2021/0339678 | A1* | 11/2021 | Kudo .................. H04N 23/698 |

FOREIGN PATENT DOCUMENTS

| | | | | | |
|---|---|---|---|---|---|
| EP | | 1974998 | A1 | 10/2008 | |
| EP | | 2003019 | A2 | 12/2008 | |
| JP | | 2009154641 | A | 7/2009 | |
| JP | | 201420688 | A | 10/2014 | |
| JP | | 2014229102 | A * | 12/2014 | |
| JP | | 5703682 | B2 * | 4/2015 | |
| JP | | 2017181586 | A | 10/2017 | |
| JP | | 2020033003 | A * | 3/2020 | |
| KR | | 101767507 | B1 * | 8/2017 | ............ B60R 1/081 |
| WO | WO-2018036250 | | A1 * | 3/2018 | ............... B60R 1/00 |
| WO | WO-2021093391 | | A1 * | 5/2021 | ............... B60R 1/00 |

OTHER PUBLICATIONS

European Search Report—EP 23181560 (Year: 2023).*
JP5703682B2 English translation of the Description (Year: 2015).*
KR101767507B1 English Translation of the Abstract (Year: 2017).*
KR101767507B1 English Translation of the Description (Year: 2017).*
JP 2014229102 A English Translation of the Description (Year: 2014).*
European Search Report from corresponding European Application No. 23181560, mailed on Nov. 9, 2023, 5 pages.
Office Action from counterpart Japanese Application No. 2022-104669, Dec. 23, 2025, 6 pages with translation.

* cited by examiner

DISPLAY CONTROL DEVICE

CROSS-REFERENCE TO RELATED APPLICATION

The present application is based on and claims priority to Japanese Patent Application No. 2022-104669, filed Jun. 29, 2022, the disclosure of which is hereby incorporated by reference in its entirety.

FIELD OF THE INVENTION

The present invention relates to a display control device.

BACKGROUND ART

Image display devices that display an image of an area that is a blind spot (blocked area) for a driver using an exterior recognition sensor such as a vehicle-mounted camera or LiDAR (Light Detection And Ranging) on a displaying part are well known.

An image displaying device has been proposed that provides a displaying part for displaying an image of the blocked area on a vehicle body obstacle that blocks a part of the field of view to the front and side in the advancing direction such as the A-pillar producing the blocked area and displays an image of the blocked area anticipated to be what the view of the driver would be assuming the vehicle body obstacle was not there (for example, see Patent Document 1: WO 2017/130439 and Patent Document 2: JP 2017-181586A1).

This manner of the image displaying device converts the image acquired by an exterior recognition sensor provided outside the vehicle cabin to an image viewed from the driver's viewpoint and displays this viewpoint-converted image on the displaying part provided on the vehicle body obstacle. Therefore, this image displaying device can show the driver the blocked area image as if transmitted through the vehicle body obstacle.

SUMMARY

The driver of a vehicle provided with the image displaying device described above views the area other than the vehicle body obstacle through the windshield using the naked eye while viewing the area of the vehicle body obstacle where the field of view is blocked using the image displayed on the displaying part. In this case, if there is a difference (position offset, color shift, brightness shift, or the like) between the visual of the area viewed by the naked eye and the image displayed on the displaying part, this difference may cause the driver to feel discomfort.

Even if the driver does not feel the manner of discomfort described above, if images are frequently displayed on the displaying part, the driver may be annoyed.

In light of the circumstances described above, an object of the present invention is to provide a display control device that displays an image of the blocked area when there is an object near the blocked area that the driver cannot sufficiently confirm and does not display the image of the blocked area when the driver can sufficiently confirm an object near the blocked area.

A display control device for controlling a displaying part, the displaying part provided on a structure of a vehicle body that hinders a field of view of a vehicle driver, and the display control device including: a processor; and a non-transitory computer-readable medium having stored thereon executable instructions that, when executed by the processor, cause the display control device to function as: an obstacle identifying part that is configured to identify an obstacle area that includes an obstacle in an image acquired from an imaging part that captures images around a vehicle; a driver information acquiring part that is configured to acquire driver information regarding the field of view of the vehicle driver; a blocked area identifying part that is configured to identify a blocked area based on driver information where the field of view of the driver is blocked by the structure; a blocked area ratio calculating part that is configured to calculate a blocked area ratio, the blocked area ratio being a ratio of an area that the blocked area overlaps the obstacle area out of a total area of the obstacle area; and a display controlling part that is configured to control the image displayed on the displaying part. The display controlling part is configured to display a driver's point of view image obtained by converting a viewpoint of the image captured by the imaging part based on the driver information when the blocked area ratio equals to a predetermined value or higher; and not to display the driver's point of view image on the displaying part when the blocked area ratio is less than the predetermined value.

DETAILED DESCRIPTION

With respect to the use of plural and/or singular terms herein, those having skill in the art can translate from the plural to the singular and/or from the singular to the plural as is appropriate to the context and/or application. The various singular/plural permutations may be expressly set forth herein for the sake of clarity.

Figure 1:
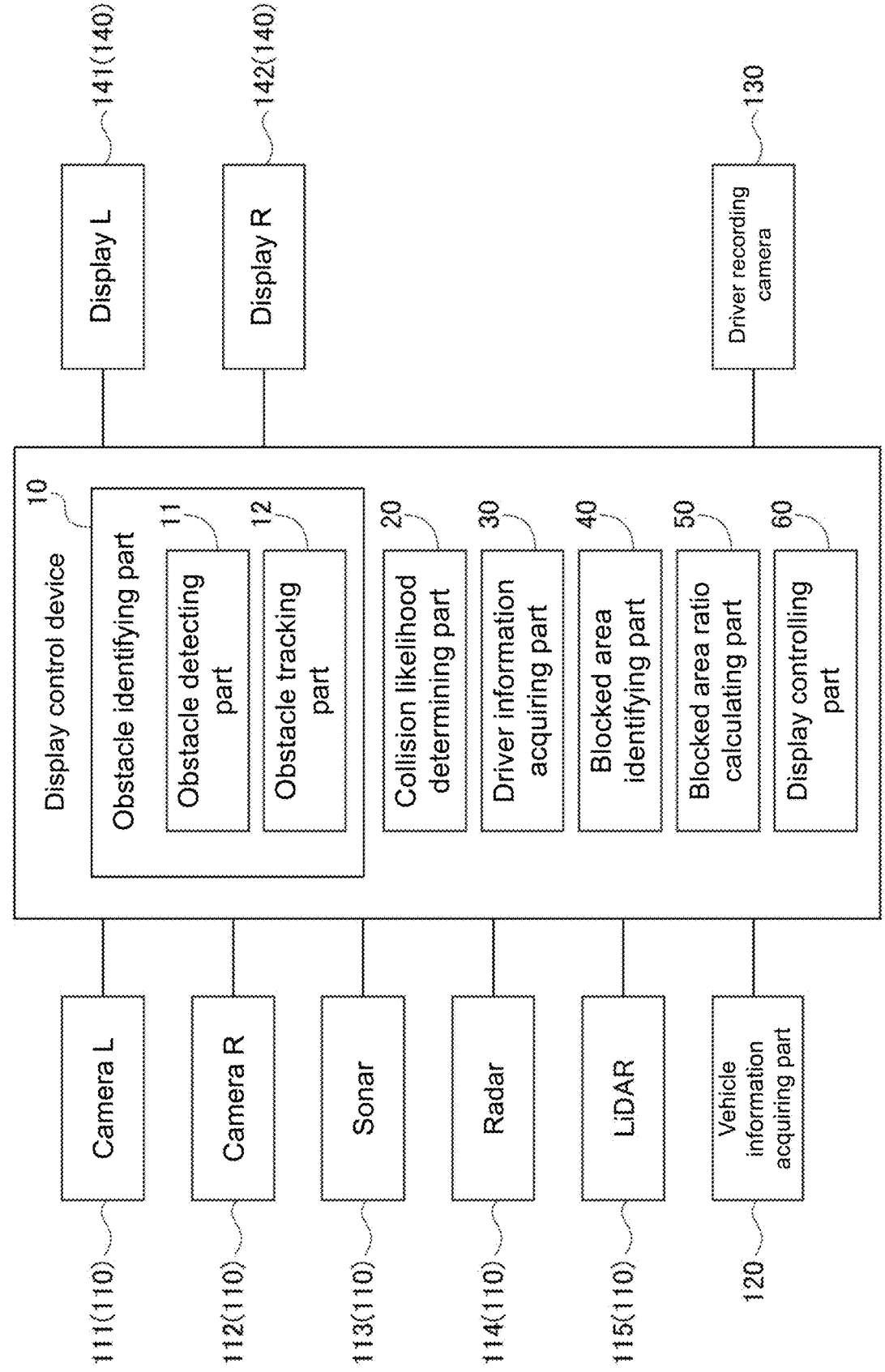
FIG. 1 is a block depicting a display control device configuration as an embodiment of the present invention.
Figure 2:
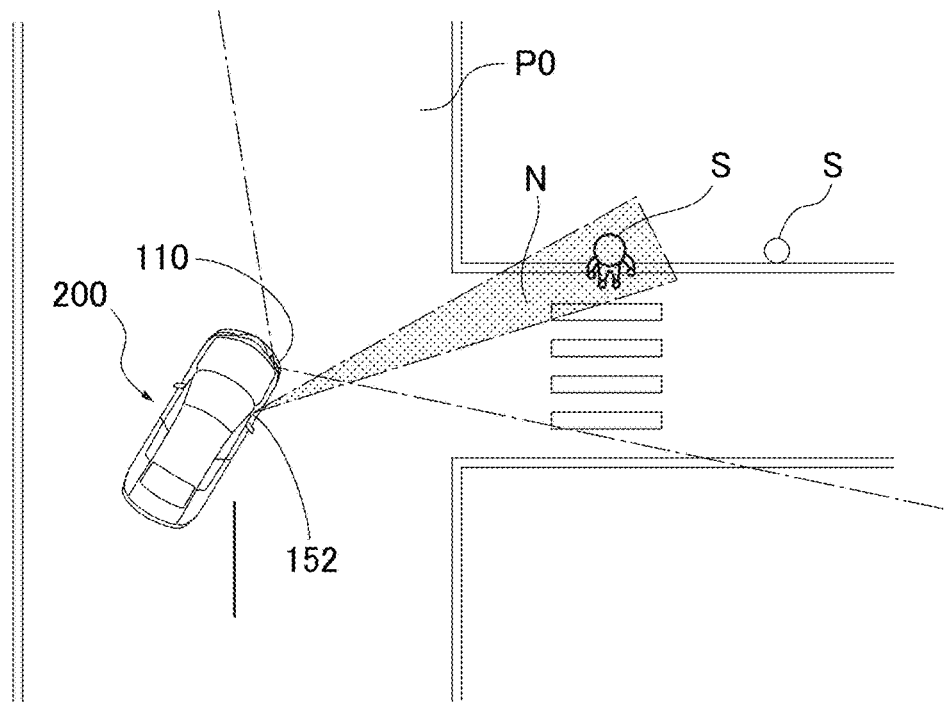
FIG. 2 is an example of the range of an image P0 captured using a camera R.
Figure 3:
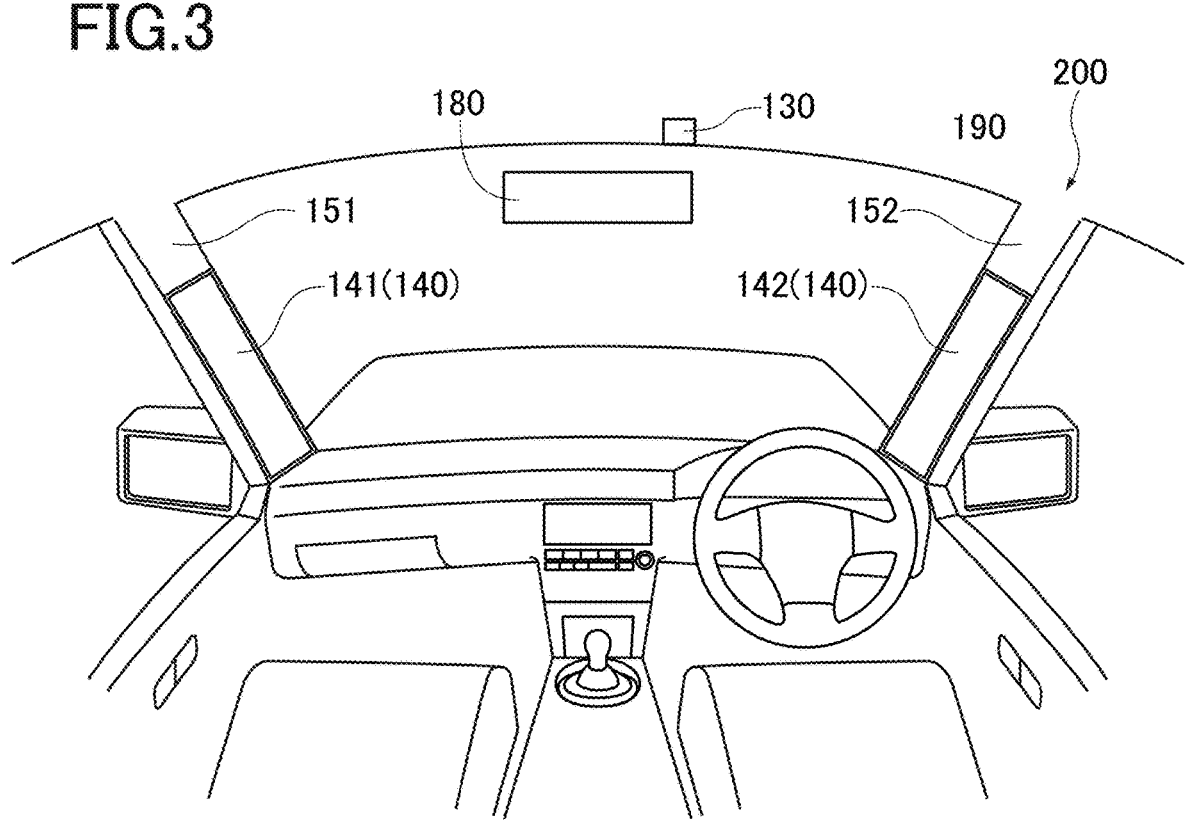
FIG. 3 is a schematic diagram depicting an example of an installation position for a driver recording camera.

Illustrative embodiments of the display control device according to the present invention will be described in detail below with reference to the drawings. FIG. 1 is a block depicting a display control device 100 configuration as an embodiment of the present invention. FIG. 2 is a schematic diagram depicting an example of the range of an image P0 captured using a camera R 112. FIG. 3 is a schematic diagram depicting an example of an installation position for a driver recording camera 130.

As illustrated in FIG. 1, an own vehicle 200 (hereinafter referred to as vehicle 200) is provided with an exterior recognition sensor 110 (example of imaging part) for detecting conditions around the vehicle, a vehicle information acquiring part 120, the driver recording camera 130, a display 140 (example of a displaying part), and the display control device 100. The exterior recognition sensor 110 may be, for example, a camera L (left) 111, a camera R (right) 112, a sonar 113, a radar 114, a LiDAR 115, or the like, or some other sensor.

As illustrated in FIG. 2, the camera R 112 is, for example, provided on the front right on the outside of the vehicle 200 and captures images P0 of subjects on the front right area of the vehicle 200. The camera L 111 is provided on the front left outside the vehicle 200 and captures images of subjects in the front left area of the vehicle 200.

The installation locations of the camera L 111 and the camera R 112 are not limited to the locations described above and may be installed in an arbitrary location of the vehicle 200 so long as the front area and side area of the vehicle 200 are set as image areas that enable visual observation by a driver sitting in the driver seat of the vehicle 200. A single camera having the functions of the camera L 111 and the camera R 112 and a wide imaging angle can be applied in place of the camera L 111 and the camera R 112.

The installation locations of the camera L 111 and the camera R 112 are also sensitive to the infrared region so that surrounding subjects can be captured even in dark conditions, such as at night. The camera L 111 and the camera R 112 may be equipped with an infrared light that illuminates the surroundings with infrared light.

A plurality of sonars 113 are distributed around the entire periphery of the outside of the vehicle cabin and detect obstacles present within a relatively short distance around the vehicle 200. Radar 114 is provided respectively on the front and rear of the vehicle 200 and these detect obstacles that are at a relatively far distance to the front of the vehicle 200 and obstacles that are at a relatively far distance to the rear of the vehicle. LiDAR 115 is provided respectively on the front and rear of the vehicle 200 and detect obstacles in a broad area to the front and rear of the vehicle 200 that are at an intermediate distance between sonar 113 and radar 114.

The vehicle information acquiring part 120 acquires operating states of the vehicle 200 such as a vehicle speed and steering angle detected by various sensors installed on the vehicle 200.

As illustrated in FIG. 3, the driver recording camera 130 is provided on a roof part 190 near a rearview mirror 180 (so-called inside mirror for viewing the rear of the vehicle 200) inside the vehicle cabin, for example, facing the driver sitting in the driver seat. The driver recording camera 130 captures the face of the driver sitting in the driver seat. The driver recording camera 130 has an angle of view enabling capturing the face of the driver regardless of the sitting height of the driver. The driver recording camera 130 also has infrared region sensitivity to enable capturing the face of the driver inside the vehicle cabin even when it is dark, such as at night. The driver recording camera 130 may be equipped with an infrared light that illuminates the driver with infrared light.

The display 140 includes a display L (left) 141 and a display R (right) 142. The display L 141 is provided on a surface of a left-side A-pillar 151 facing the inside of the vehicle cabin and the display R 142 is provided on a surface of a right-side A-pillar 152 facing the inside of the vehicle cabin. A liquid crystal display, for example, can be used as the display 140 and in this case, displays 140 are attached respectively to the left side A-pillar 151 and to the right side A-pillar 152. In the case that the displays 140 are formed in a film shape such as organic EL, for example, the displays are arranged respectively along the surface of the left side A-pillar 151 and the surface of the right side A-pillar 152.

The A-pillars are pillar members that are respectively provided on the left and right edges of the vehicle windshield and that support the roof panel of the vehicle body. The position of the left side A-pillar 151 on the vehicle 200 and the position of the right side A-pillar 152 on the vehicle 200 are stored in advance in the blocked area identifying part 40.

The display control device 100 of the present embodiment controls the display L 141 provided on the left side A-pillar 151, and the display R 142 provided on the right side A-pillar 152, which are examples of vehicle body structural members of the vehicle 200 that obstruct the field of view of the driver. As illustrated in FIG. 1, the display control device 100 includes an obstacle identifying part 10, a collision likelihood determining part 20, a driver information acquiring part 30, the blocked area identifying part 40, a blocked area ratio calculating part 50, and a display controlling part 60.

The obstacle identifying part 10 includes an obstacle detecting part 11 and an obstacle tracking part 12. The obstacle detecting part 11 detects obstacles S and the size thereof detected around the vehicle 200 based on images P0 photographed and acquired by the camera L 111 and the camera R 112 that capture peripheral images, and information such as distance detected by the sonar 113, the radar 114, and the LiDAR 115.

Obstacles that can be obtained based on image P0 also include plane objects such as lines drawn on the road, pedestrian crossings, and arrows, but in combination with information obtained from sonar 113, radar 114, and LiDAR 115, the obstacles S detected by the obstacle detecting part 11 are narrowed down to three-dimensional objects that can collide with the vehicle 200.

Detected obstacles S include moving objects such as pedestrians, bicycles, wheelchairs, small mobility vehicles (for example, kickboards), motorcycles, and animals, as well stationary objects such as traffic lights, guardrails, utility poles, curbs, cones (pylons), and poles.

The obstacle tracking part 12 distinguishes obstacles S detected by the obstacle detecting part 11 as moving objects or stationary objects based on the positional relationship relative to the vehicle 200 according to the vehicle 200 state (state such as moving or stationary) acquired by the vehicle information acquiring part 120. In the case that the obstacle S is a moving object, the obstacle tracking part 12 determines the direction of travel and moving speed of the moving object.

Based on the direction of travel and moving speed of the obstacle S over time, the obstacle tracking part 12 predicts the subsequent motion status (whether the object will continue to move at a constant speed, accelerate, decelerate, stop, or the like) of the obstacle S.

The obstacle identifying part 10 identifies each of the obstacles S obtained by the obstacle tracking part 12 in the image P0. For example, the obstacle identifying part 10 encircles the obstacle S with a rectangular frame K set slightly larger than the outline of the obstacle S and identifies the obstacle S as an obstacle area R defined as the area enclosed by the rectangular frame K. The frame around the obstacle S may be a frame shaped like the outline of the obstacle S instead of being rectangular.

As an example of information regarding a field of view of the driver sitting in the driver seat, the driver information acquiring part 30 acquires the position of the eyes of the driver based on the driver's face captured by the driver recording camera 130. The information acquired by the driver information acquiring part 30 need only be information enabling calculation of the direction that the driver is looking and, for example, information regarding the position of the head of the driver, or the like, can be acquired.

The blocked area identifying part 40 identifies the blocked regions N as regions where the field of view of the driver is blocked by the A-pillars 151 and 152. The blocked area identifying part 40 identifies the blocked region N (see FIG. 2), for example, that is the region of the field of view region to the front and right of the vehicle 200 viewable from the position of the driver's eyes that is blocked by the right side A-pillar 152 based on the position of the driver's eyes acquired by the driver information acquiring part 30 and the pre-stored relative positional relationship of the position the right side A-pillar 152 is installed in on the vehicle 200.

The blocked area identifying part 40 converts the image P0 captured by the camera R 112 to the point of view in the image (driver's point of view image P1) as the point of view of the position of the driver's eyes detected by the driver information acquiring part 30.

Figure 4:
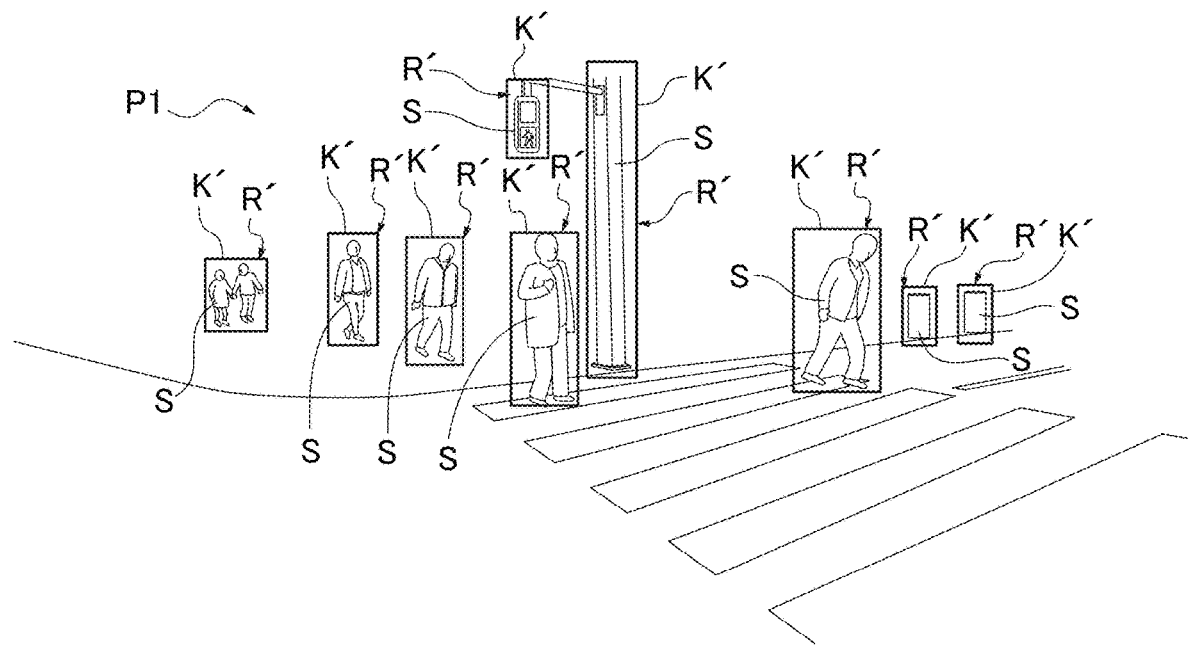
FIG. 4 is an example of a driver's point of view image of the subject corresponding to an image P0 captured by a camera R anticipated to be what would be viewed by the naked eye of the driver for the position of the eyes of the driver.

FIG. 4 is an example of an image P0 captured by the camera R 112 that is converted to the driver's point of view image P1 based on the position of the driver's eyes. As illustrated in FIG. 4, the driver's point of view image P1 includes the subject in the image P0 captured by the camera R 112 and is an image predicted as the field of view as viewed by the naked eye of the driver at the position of the driver's eyes.

Figure 5:
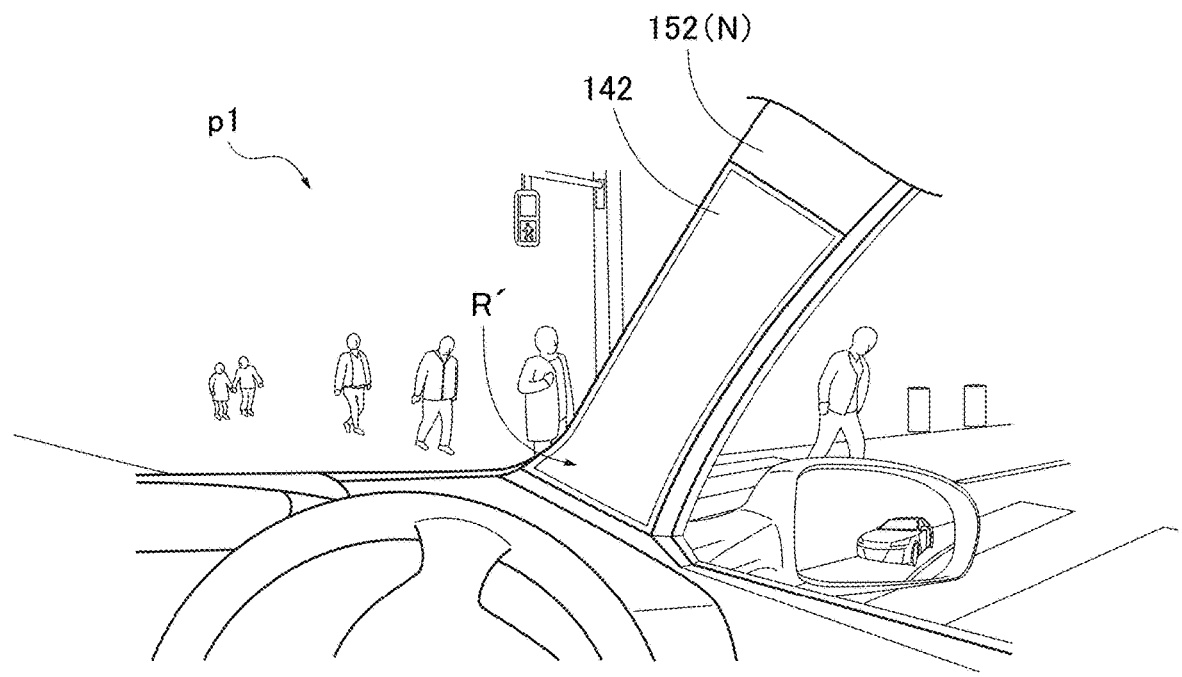
FIG. 5 is a diagram depicting an example of a visual p1 actually viewed by the naked eye of the driver.

FIG. 5 is a diagram depicting an example of visual p1 actually viewed by the naked eye of the driver. In the visual p1 actually viewed by the naked eye of the driver, the driver cannot see the subject present behind the blocked region N that is blocked by the right side A-pillar 152.

However, the driver's point of view image P1 is an image of the image P0 captured using the camera R 112 provided on the outside of the vehicle body structure such as the right side A-pillar 152 with viewpoint converted based on information such as the position of the driver's eyes; therefore, the driver's point of view image P1 is an image also showing the subject present behind the blocked region N.

Figure 6:
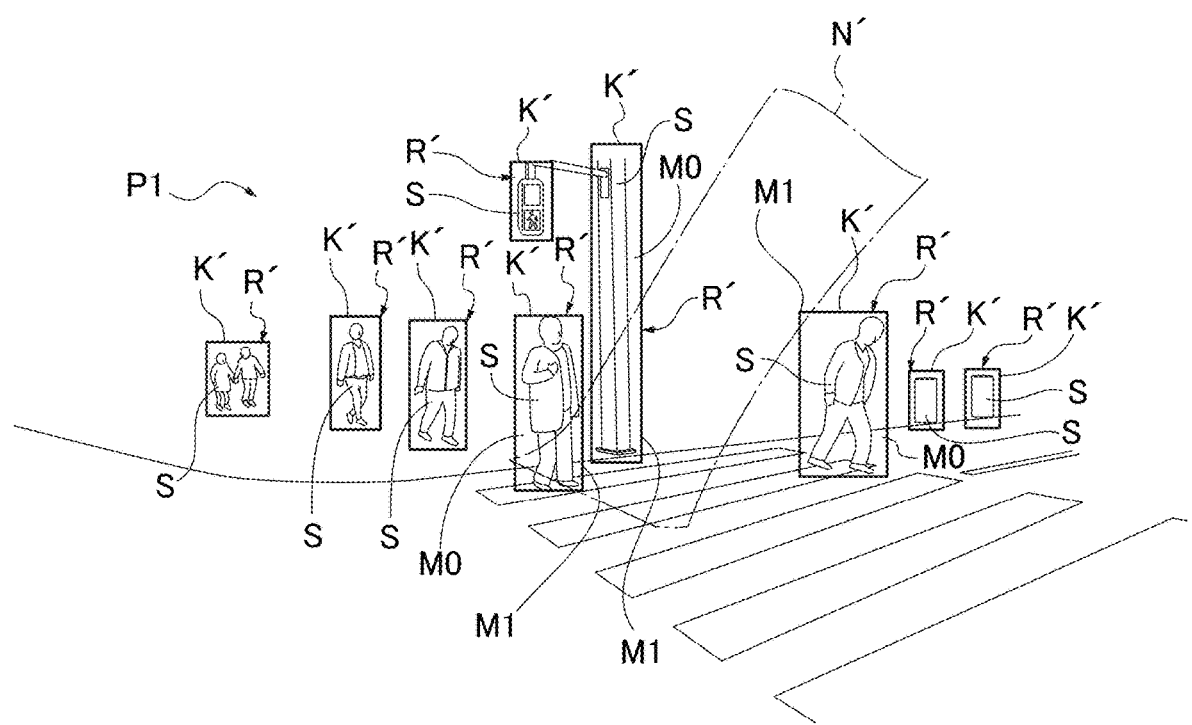
FIG. 6 is a diagram depicting a blocked area N' in the driver's point of view image P1 corresponding to a blocked region N due to the right side A-pillar in the visual p1 viewed by the naked eye of the driver.

The blocked area identifying part 40 identifies the blocked area N' as illustrated in FIG. 6 corresponding to the blocked region N of the right side A-pillar 152 in visual p1, viewed by the naked eye of the driver in the driver's point of view image P1.

Here, the obstacle identifying part 10 identifies the obstacle S identified in the image P0 as an obstacle area R' in the driver's point of view image P1. The obstacle identifying part 10 reflects, for example, the rectangular frame K set in the image P0 before viewpoint conversion in the driver's point of view image P1. In this case, the obstacle identifying part 10 may transform the rectangular frame K to a rectangular frame K' that is set slightly larger than the outline of the obstacle S and identify the area enclosed in the rectangular frame K' as an obstacle area R'. Inside the area enclosed in the frame in a rectangular frame K, rectangular frame K', or edge of obstacle S outline is the obstacle area R' in the driver's point of view image P1.

The blocked area identifying part 40 determines whether or not the obstacle area R' overlaps with the blocked area N'. In the naked eye visual p1 (FIG. 5) based on the position of the driver's eyes, when a part of the obstacle area R' is included in the blocked region N that is blocked by the right side A-pillar 152 so that the part of the obstacle area R' cannot be seen by the driver or when all of the obstacle area R' is included in the blocked region N that is blocked by the right side A-pillar 152 so that all of the obstacle area R' cannot be seen by the driver, the blocked area identifying part 40 determines that the obstacle area R' overlaps with the blocked area N'.

On the other hand, in the naked eye visual p1 based on the position of the driver's eyes, if no part of the obstacle area R' is included in the blocked region N that is blocked by the right side A-pillar 152, the obstacle area R' is determined to not overlap with the blocked area N'. Here, there is no obstacle area R' that is blocked by the right side A-pillar 152 and the driver can sufficiently confirm the entirety of the obstacle area R'.

The blocked area ratio calculating part 50 calculates a blocked area ratio (=M1/M0) that is the ratio that an area M1 where the field of view of the driver is blocked due to overlapping of the blocked area N' on the obstacle area R' accounts for of the total area M0 of the obstacle area R'. Here, the blocked area ratio calculating part 50 calculates a blocked area ratio regarding the area where the blocked area identifying part 40 determines that the blocked area N' overlaps with the obstacle area R'.

For example, the overall area M0 of the obstacle area R' in the driver's point of view image P1 and the area M1 of the range that each obstacle area R' overlaps with the blocked area N' are calculated. The blocked area ratio (=M1/M0) [%] that is the ratio of the area M1 of the range blocked due to overlapping with the blocked area N' relative to the total area M0 of the obstacle area R' is calculated.

When there is a plurality of obstacle areas R' present in the driver's point of view image P1, the blocked area ratio is calculated for each obstacle area R'.

The collision likelihood determining part 20 determines the likelihood of collision between the vehicle 200 and the obstacle S based on the state of the vehicle 200 (for example, speed and steering angle, direction indicator operation state) acquired by the vehicle information acquiring part 120 and each obstacle S identified by the obstacle identifying part 10.

In other words, after a prescribed amount of time, if a future position of the vehicle 200 predicted based on the operating state of the vehicle 200 and a future position of any of the obstacle areas R predicted based on the state of the obstacle areas R (direction of travel and traveling speed) identified by the obstacle identifying part 10 overlap, the collision likelihood determining part 20 determines there is a likelihood of collision between the vehicle 200 and the obstacle S after the prescribed time elapses.

On the other hand, after a prescribed amount of time, if a future position of the vehicle 200 predicted based on the operating state of the vehicle 200 such as speed and steering angle of the vehicle 200 and a future position of the obstacle area R predicted based on the state of the obstacle area R identified by the obstacle identifying part 10 do not overlap, the collision likelihood determining part 20 determines there is not a likelihood of collision between the vehicle 200 and the obstacle S after the prescribed time elapses.

Based on the vehicle 200 state acquired by the vehicle information acquiring part 120, the collision likelihood determining part 20 predicts the position of the vehicle 200 after the prescribed period of time, premised on the continuation of that state (for example, in the case of operating at constant speed and constant steering angle, the state of continuing at the constant speed and constant steering angle for the prescribed period of time, or for example, in the case of operating at constant acceleration and at a steering angle with constant angular acceleration, state of continuing the constant acceleration and constant angular acceleration for the prescribed period of time).

Here, as illustrated in FIG. 2, for example, with the vehicle 200 in the right lane at an intersection, flashing a direction indicator in the right direction for turning right, temporarily stopped, and an obstacle S is moving in the crosswalk on the right side of the intersection, the future position predicted by the collision likelihood determining part 20 with a vehicle 200 speed of 0 [km/h] is the same as the current position. Therefore, the collision likelihood determining part 20 determines there is no likelihood of collision with the obstacle S moving in the crosswalk on the right side of the intersection.

However, for a vehicle 200 stopped in the right turning lane in an intersection where there is a break in traffic traveling in the opposite direction lane, and there are no obstacles S moving in the crosswalk on the right side of the intersection, there is a possibility of starting from the stopped state (vehicle speed 0 [km/h]) and turning right.

Here, the collision likelihood determining part 20 uses not only the prediction of future position premised simply on the continuation of the vehicle 200 state but also takes into consideration vehicle information such as the operating state of the direction indicator (flashing state or OFF state of either left or right direction indicator light) to predict the future position of the vehicle 200 for determining the likelihood of collision between the vehicle 200 and the obstacle S over a prescribed period of time.

The collision likelihood determining part 20 can combine map information acquired from the navigation device (not illustrated) with the vehicle information for determining the likelihood of a collision.

Figure 7:
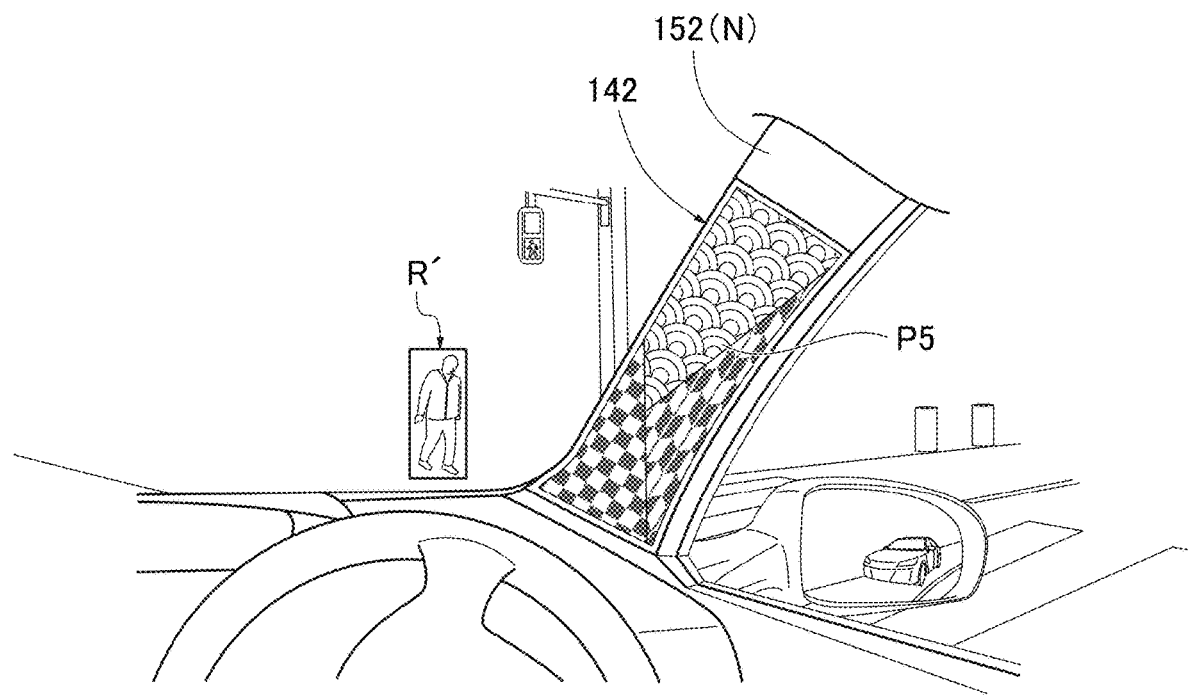
FIG. 7 is a schematic diagram depicting a state of an interior view P5 being displayed on the display R.
Figure 8:
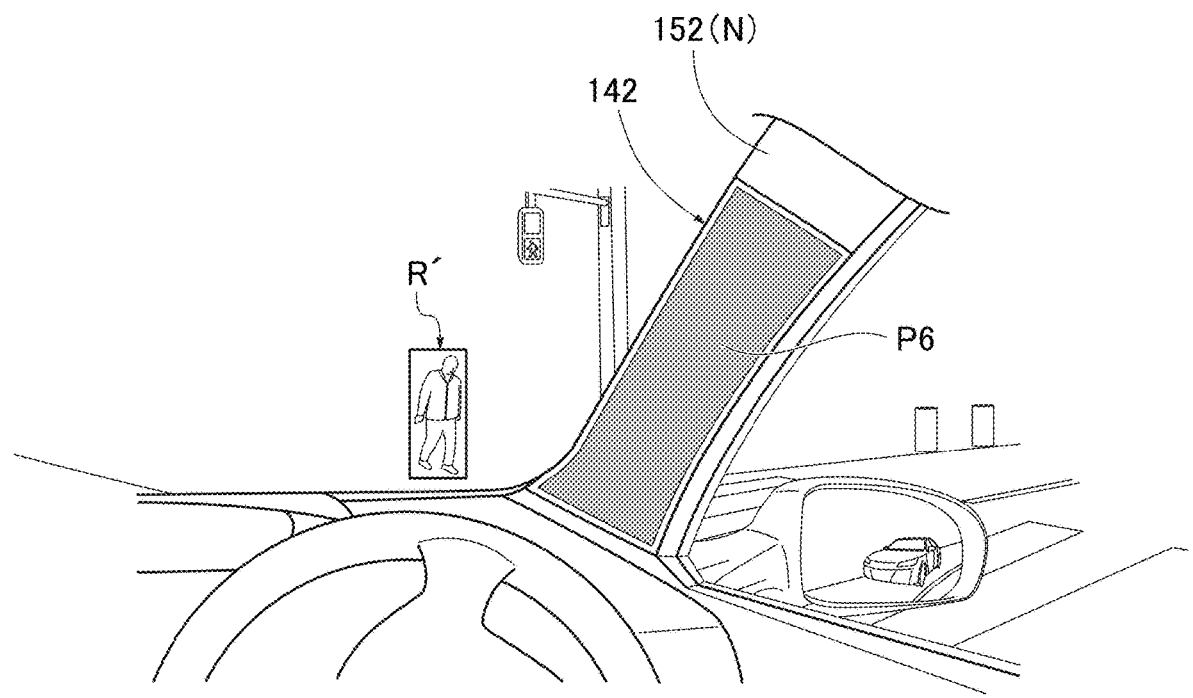
FIG. 8 is a schematic diagram depicting a state of no display P6 on the display R.

FIG. 7 is a schematic diagram depicting a state of an interior view P5 being displayed on the display R 142. FIG. 8 is a schematic diagram depicting a state of no display P6 on the display R 142. Based on the determination results of the collision likelihood determining part 20 and the blocked area ratio from the blocked area ratio calculating part 50, the display controlling part 60 controls switching of display content such as the image displayed on the display R 142 provided overlapping on the right side A-pillar 152.

If the determination results from the collision likelihood determining part 20 are that there is no likelihood of collision between the vehicle 200 and the obstacle S, the display controlling part 60 displays an interior view P5 composed of a pattern serving as decoration inside the vehicle cabin as illustrated in FIG. 7, for example, on the display R 142 regardless of the blocked area ratio from the blocked area ratio calculating part 50. Or, in this case, the display controlling part 60 provides control to achieve no display P6 as illustrated in FIG. 8. From the perspective of energy conservation, the display controlling part 60 preferably provides a control for a state of not displaying anything, such as the no display P6.

From the perspective of preventing the screen from taking away the focus of the driver, the interior view P5 is preferably a still image. The interior view P5 is not limited to an image composed of a plurality of types of patterns but may be an image composed of a single pattern or may be a still image composed of a single uniform color or a single color with a gradation. If a video is applied as the interior view P5, one where the motion is slow enough to not attract the attention of the driver is preferable.

Figure 9:
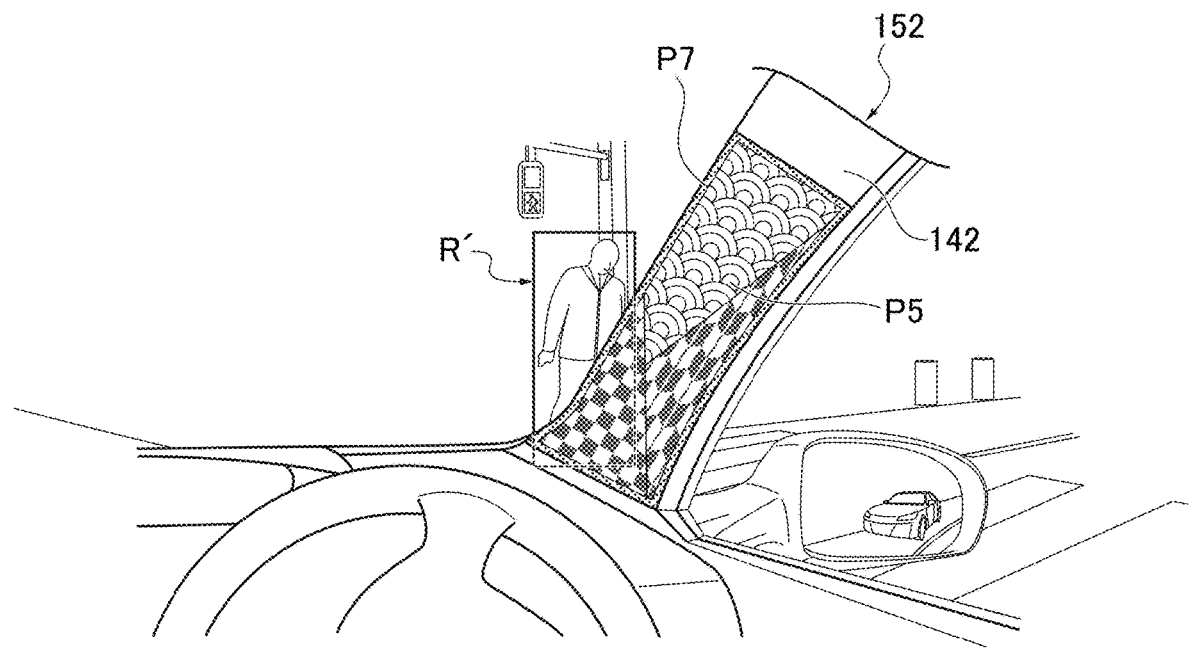
FIG. 9 is a schematic diagram depicting a state of the interior view P5 and a warning display P7 being displayed on the display R.
Figure 10:
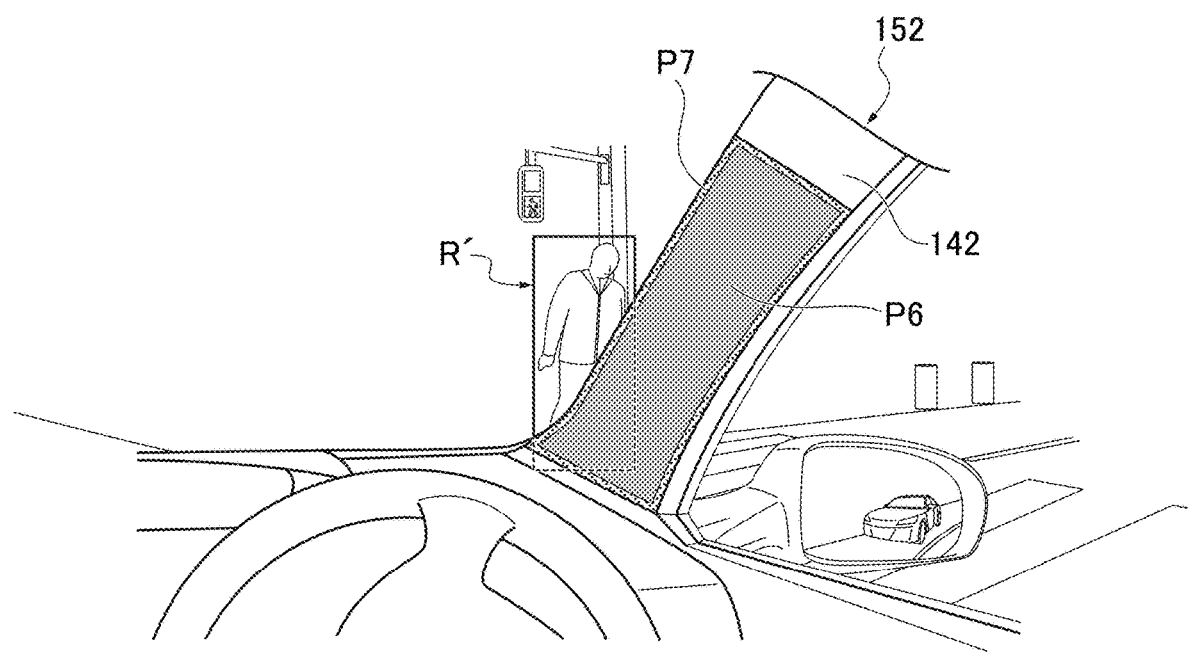
FIG. 10 is a schematic diagram depicting the state of no display P6 on the display R while displaying the warning display P7.

FIG. 9 is a schematic diagram depicting a state of an interior view P5 and warning display P7 being displayed on the display R 142. FIG. 10 is a schematic diagram depicting a state of no display P6 on the display R 142 while displaying a warning display P7.

If the determination results from the collision likelihood determining part 20 are determination results that there is the likelihood of a collision between the vehicle 200 and the obstacle S and the blocked area ratio of the obstacle area R' from the blocked area ratio calculating part 50 is less than 80 [%], the display controlling part 60 controls the display R 142 so as to not display the transparent view P2. The transparent view P2 is an image of cutting the blocked area N' out of the driver's point of view image P1.

The display controlling part 60 provides control so as to display a warning display P7 on the display R 142 warning the driver of the presence of an obstacle S, a part of which cannot be viewed due to blocking by the right side A-pillar 152. The warning display P7 is, for example, a display of red light illumination of the outer edge of the display R 142.

As illustrated in FIG. 9, the display controlling part 60 displays, for example, the warning display P7 together with the interior view P5 on the display R 142. As illustrated in FIG. 10, the display controlling part 60 may display the warning display P7 together with the no display P6 on the display R 142.

Figure 11:
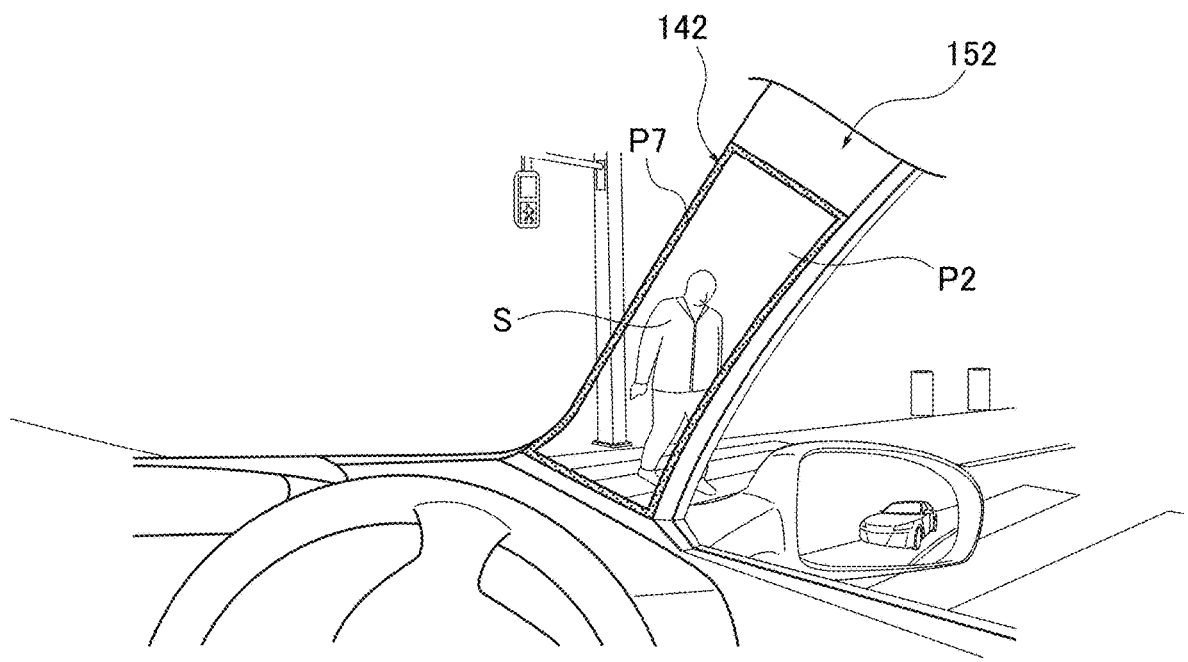
FIG. 11 is a schematic diagram depicting a state where, of the driver's point of view image P1, a transparent view P2 that is an image in the blocked area N' and the warning display P7 are displayed on the display R.

FIG. 11 is a schematic diagram depicting a state where, of the driver's point of view image P1, a transparent view P2 that is an image in the blocked area N' and the warning display P7 are displayed on the display R 142.

In the case the determination results from the collision likelihood determining part 20 are determination results that there is the likelihood of collision between the vehicle 200 and the obstacle S, and the blocked area ratio of the obstacle area R' from the blocked area ratio calculating part 50 is 80 [%] or more, the display controlling part 60 cuts out the image of the blocked area N' of the driver's point of view image P1, and displays this cut-out image as the transparent view P2 on the display R 142. For example, as illustrated in FIG. 11, the display controlling part 60 displays the warning display P7 together with displaying the transparent view P2. It is acceptable if the display controlling part 60 does not display the warning display P7 on the display R 142.

Figure 12:
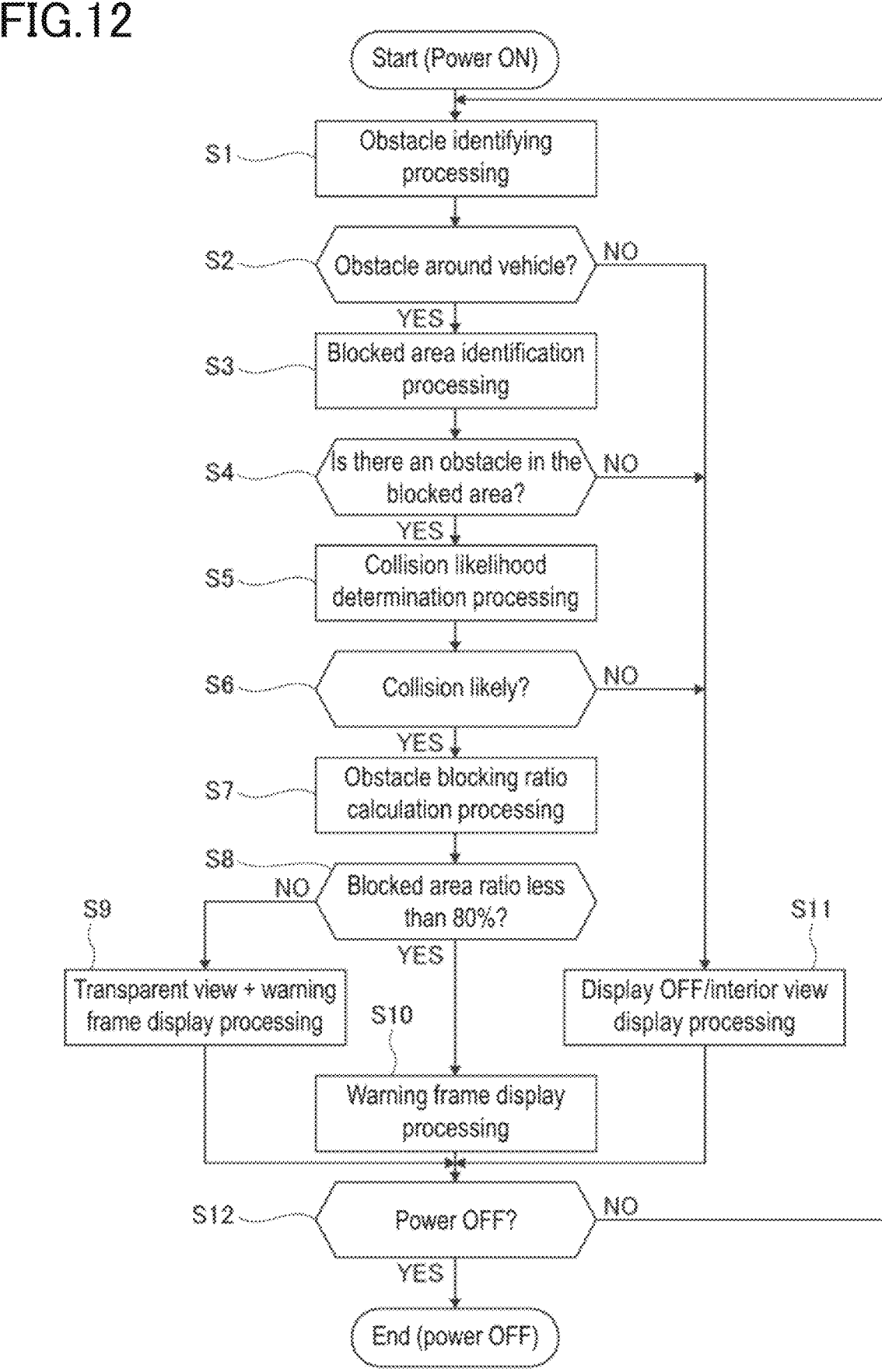
FIG. 12 is a flowchart describing display control device operation flow.

The display control device 100 configured as described above operates as follows. FIG. 12 is a flowchart describing display control device 100 operation flow. The description below is for a subject in the front-right field of view of the vehicle 200; however, a subject in the front-left field of view is the same as the subject in the front-right field of view.

When the vehicle 200 is in a state of being able to start travel, the power is ON and the display control device 100 starts operating. First, the display control device 100 performs obstacle identification processing (S1 in FIG. 2); however, when the power of the display control device 100 is first turned ON, by default, the display R 142 is controlled to display the interior view P5 (see FIG. 7), described below, or no display P6 (see FIG. 8).

Obstacle identification processing determines whether or not an obstacle S has been detected by the obstacle identifying part 10 based on the image P0 captured by the camera R 112 and whether the obstacle S is present around the vehicle 200 (S2).

If it is determined that an obstacle S is not present around the vehicle 200 (case of NO in S2), the display controlling part 60 does not display the transparent view P2 on the display R 142. The display controlling part 60 displays the interior view P5 illustrated in FIG. 7 or no display P6 illustrated in FIG. 8 on the display R 142 (S11).

If it is determined that an obstacle S is present around the vehicle 200 (case of YES in S2), the display control device 100 performs blocked area identification processing (S3). In the blocked area identification processing, the blocked area identifying part 40 identifies a blocked area N' corresponding to the blocked region N within the driver's point of view image P1 due to the right side A-pillar 152 as viewed by the naked eye from the position of the driver's eyes and determines whether or not there is an obstacle S in the blocked area N' (S4). The determining process of whether or not an obstacle S is present in the blocked area N' is a determining process of whether or not the obstacle area R' overlaps with the blocked area N' in the driver's point of view image P1.

The obstacle area R' overlapping with the blocked area N' means a part or all of the obstacle S as viewed by the naked eye from the position of the driver's eyes overlaps with the blocked region N due to the right side A-pillar 152 and cannot be seen.

When the blocked area identifying part 40 determines that the obstacle area R' does not overlap with the blocked area N' (case of NO in S4), the display controlling part 60 displays the interior view P5 illustrated in FIG. 7 or the no display P6 illustrated in FIG. 8 on the display R 142 (S11).

When the blocked area identifying part 40 determines that the obstacle area R' overlaps with the blocked area N' (case of YES in S4), the display control device 100 performs collision likelihood determination processing (S5). In collision likelihood determination processing, the collision likelihood determining part 20 determines whether or not there is the likelihood of collision between the vehicle 200 and the obstacle S (S6).

When it is determined that there is no likelihood of collision (case of NO in S6), the display controlling part 60 displays the interior view P5 illustrated in FIG. 7 or the no display P6 illustrated in FIG. 8 on the display R 142 (S11).

When it is determined that there is a likelihood of collision (case of YES in S6), the display control device 100 performs obstacle-blocking ratio calculation processing (S7). In the obstacle blocking ratio calculation processing, the blocked area ratio calculating part 50 calculates the blocked area ratio (=M1/M0) based on the area M0 of the obstacle area R' in the driver's point of view image P1 and the area M1 of the obstacle area R' overlapping with the blocked area N' in the driver's point of view image P1 identified by the blocked area identifying part 40, and determines whether or not the blocked area ratio is less than 80 [%] (S8).

When the blocked area ratio calculated by the blocked area ratio calculating part 50 is not determined to be less than 80 [%] (case of NO in S8), the display controlling part 60 displays the transparent view P2 that, of the driver's point of view image P1, is within the blocked area N' on the display R 142, as illustrated in FIG. 11. The display controlling part 60 may display the warning display P7 of illuminating the outer edge of the display R 142 in red together with displaying the transparent view P2 on the display R 142 (S9).

Of the overall area of the obstacle area R', when the ratio of an area that overlaps and is blocked by the blocked area N' is larger than a predetermined value (for example, 80 [%]), the display controlling part 60 displays the transparent view P2 on the display R 142.

When there is a plurality of obstacle areas R' overlapping within the blocked area N', if there is even one obstacle area R' where the blocked area ratio is at the predetermined value or higher, the display controlling part 60 displays the transparent view P2 on the display R 142. In this case, the display controlling part 60 displays all of the obstacle areas R' that overlap within the blocked area N' including obstacle areas R' where the blocked area ratio is less than the predetermined value as the transparent view P2 on the display R 142.

If the blocked area ratio for all of the plurality of obstacle areas R' that overlap within the blocked area N' does not exceed the predetermined value, the display controlling part 60 does not display the transparent view P2 on the display R 142.

On the other hand, if it is determined that the blocked area ratio is less than 80 [%] (case of YES in S8), the display controlling part 60 displays the warning display P7 together with displaying the interior view P5 as illustrated in FIG. 9 or setting no display P6 and displaying the warning display P7 on the display R 142 (S10).

Of the overall area of the obstacle area R', when the ratio of an area that overlaps and is blocked by the blocked area N' is smaller than a predetermined value (for example, 80 [%]), the display controlling part 60 does not display the transparent view P2 on the display R 142. By not displaying the transparent view P2 when the driver can confirm a major portion of the obstacle S with the naked eye, the annoyance due to frequent display of the transparent view P2 and discomfort felt with regards to the displayed transparent view P2 can be mitigated.

After display is performed on the display R 142 based on S9, S10, or S11 processing and the main power of the vehicle 200 is cutoff, processing returns to S1 and processing from S1 to S12 is repeated until the power source (S12) of the display control device 100 is turned OFF (case of NO in S12). When the main power of the vehicle 200 is cut off and the power source of the display control device 100 is turned OFF (case of YES in S12), the power source of the display control device 100 is turned OFF.

The description of the display control device 100 described above was primarily for a subject in the front right field of view of the vehicle 200 but regarding a subject in the front left field of view of the vehicle 200, the same processing as that performed for a subject in the front right field of view is performed. In other words, after detecting the obstacle S in the left front range and identifying the obstacle area R based on the left front image P0 captured using the camera L 111, and then converting to the driver's point of view image P1, the display control device 100 selects the image displayed on the display L 141 installed on the left side A-pillar 151 according to the likelihood of collision between the vehicle 200 and the obstacle S and the area ratio of the obstacle area R' corresponding to the obstacle S for which there is the possibility of collision that is blocked by the left side A-pillar 151.

As described in detail above, when there is an obstacle around the vehicle 200 for which there is a likelihood of collision with the vehicle 200 and when the subject to the front right is viewed using the naked eye from the position of the eyes of the driver sitting in the driver seat of the vehicle 200, if a certain amount (area ratio of, for example, 80 [%]) or higher of the obstacle S is hidden by the right side A-pillar 152 such that the obstacle S is difficult for the driver to confirm, the display control device 100 displays the image (transparent view P2) of this obstacle S on the display R 142 installed on the right side A-pillar 152 (FIG. 11).

This enables the driver to confirm the subject in the front right field of view not hidden by the right side A-pillar 152 as a visual as if viewed by the naked eye of the driver. Regarding the blocked region N that the driver is unable to confirm with the naked eye due to the right side A-pillar 152, the driver can confirm an image within the blocked area N' from the driver's point of view image P1 that is displayed on the display R 142 provided on the right side A-pillar 152.

In other words, the driver is provided an optical illusion, the transparent view P2 that is the image within the blocked area N' displayed on the display R 142 provided on the right side A-pillar 152, as an image as if viewed through the right side A-pillar 152, enabling viewing the subject in the front right field of view as a quasi-single visual with the visual viewed with the naked eye and the image displayed on the display R 142 connected.

Therefore, overlooking of an obstacle S for which there is the likelihood of collision due to being difficult to see by the driver can be reduced.

On the other hand, displaying the warning display P7 indicates to the driver that the image displayed on the display R 142 provided on the right side A-pillar 152 is not an actual visual that the driver is viewing with the naked and so evokes caution relative to overconfidence regarding the image displayed on the display R 142.

Even in a case that there is a likelihood of collision between the vehicle 200 and an obstacle around the vehicle 200, the display control device 100 of the present embodiment does not display the transparent view P2 of the obstacle area R' on the display R 142 provided on the right side A-pillar 152 when less than a certain amount (area ratio of, for example, 80 [%]) of the obstacle area R' overlaps with the blocked area N', and displays the interior view P5 and warning display P7 (FIG. 9) or just the warning display P7 (FIG. 10).

The state of only less than a certain amount of the obstacle area R', which overlaps with the blocked area N', being hidden corresponds to the state with the subject to the front-right as viewed with the naked eye from the position of the eyes of the driver sitting in the driver's seat of the vehicle 200 where only less than a certain amount of the obstacle S is hidden by the right side A-pillar 152. Conversely, in this case, a certain amount or more of the obstacle S is exposed outside of the blocked area N' so the driver can sufficiently confirm this obstacle S with the naked eye.

Therefore, when the driver can sufficiently confirm the obstacle S with the naked eye, the need to display an image of the obstacle S (transparent view P2) on the display R 142 provided on the right side A-pillar 152 is low.

By not displaying the image of the obstacle S (transparent view P2) when the need to display the obstacle S on the display R 142 is low, the display control device 100 of the present embodiment can reduce the chances of causing discomfort to the driver due to differences (position offset, color deviation, brightness deviation, and the like) between the visual based on the naked eye and the image displayed on the display R 142. This enables the display control device 100 to reduce annoyance felt by the driver due to frequent displaying of the transparent view P2.

By setting no display P6 that does not even display the interior view P5 when the need for displaying the obstacle S on the display R 142 is low, the display control device 100 enables reduction of power consumption of the display R 142 and thus achieves energy conservation. Reducing the power consumption of the display R 142 enables extending the life of the display R 142.

Even if the need to display the obstacle S on the display R 142 is low, the state is that a part of the obstacle S is hidden by the right side A-pillar 152, so having the display control device 100 display the warning display P7 on the display R 142 enables providing the driver with a warning that a part of the obstacle S is hidden by the right side A-pillar 152.

Various forms of display can be applied for the display control device 100 to display the warning display P7 on the display R 142 and this is not limited to the frame-shaped display described above. The warning display P7 is not limited to an aspect of continuously ON and may be an aspect of flashing or a form repeating light and darkness.

Figure 13:
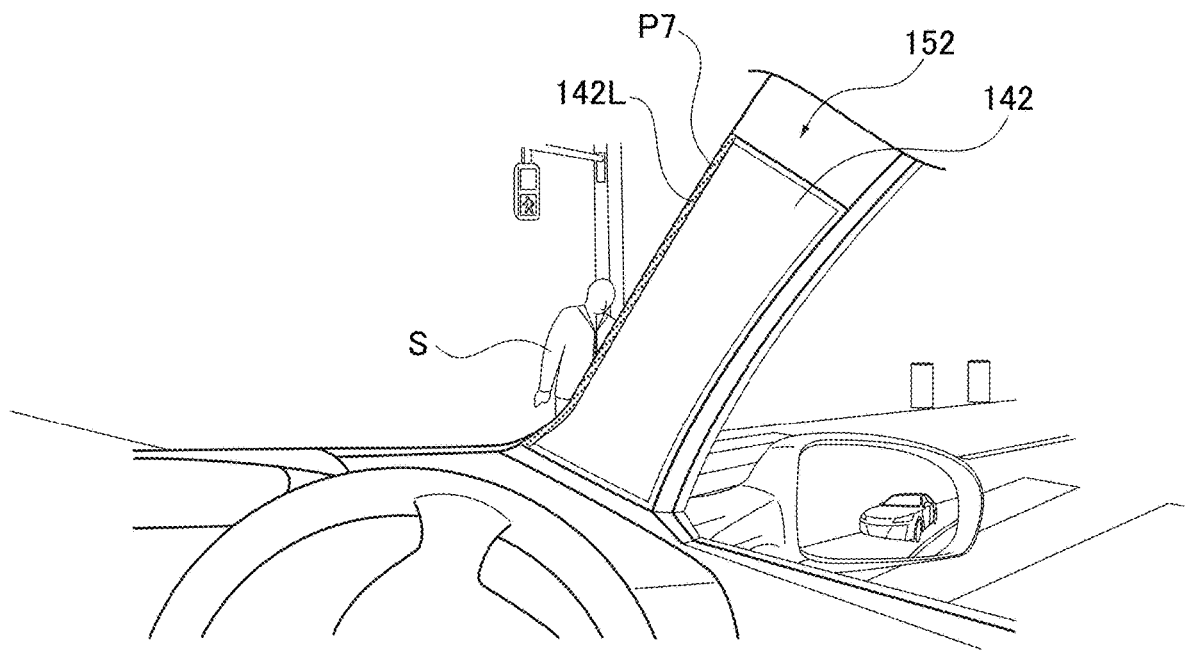
FIG. 13 is a schematic diagram depicting a state of illuminating just the left edge part of the display R corresponding to the side where the obstacle S is blocked as the warning display P7.
Figure 14:
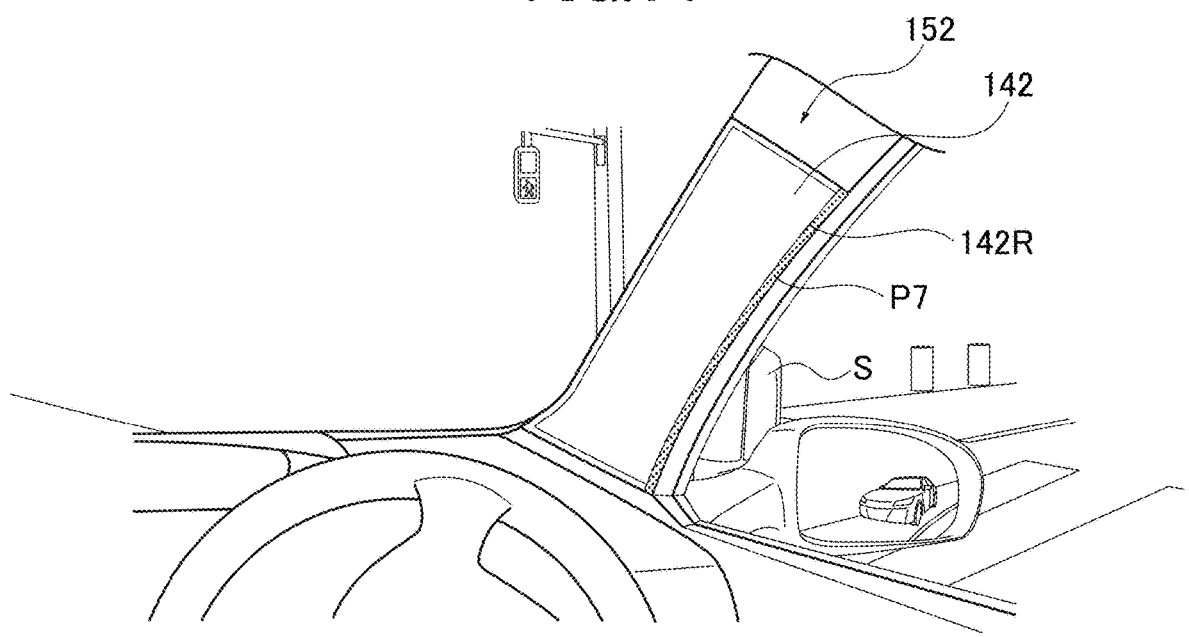
FIG. 14 is a schematic diagram depicting a state of illuminating just the right edge part of the display R corresponding to the side where the obstacle S is blocked as the warning display P7.

FIG. 13 is a schematic diagram depicting a state of illuminating just the left edge part 142L of the display R 142 corresponding to the side where the obstacle S is blocked as the warning display P7. FIG. 14 is a schematic diagram depicting a state of illuminating just the right edge part 142R of the display R 142 corresponding to the side where the obstacle S is blocked as the warning display P7.

Of both the left and right edges of the display R 142, an aspect for the warning display P7 of only illuminating the edge corresponding to the boundary of the portion of the obstacle S hidden by the right side A-pillar 152 and the portion exposed can be applied.

For example, as illustrated in FIG. 13, when the obstacle S moves from left to right relative to the right side A-pillar 152 and starts to be hidden by the right side A-pillar 152, the display control device 100 only illuminates the left edge part 142L of the display R 142 as the warning display P7 and does not illuminate the other edges. Also, as illustrated in FIG. 14, when the obstacle S starts to be exposed on the right side from the state of being hidden by the right side A-pillar 152, the display control device 100 illuminates only the right edge part 142R of the display R 142 as the warning display P7 and does not illuminate the other edges.

In addition to that described above, the display control device 100 may only illuminate the area of the edge of the display R 142 that the obstacle S overlaps with. For example, in FIG. 13, the obstacle S overlaps with the lower half of the left edge part 142L so an example where the display control device 100 only illuminates the lower half of the left edge part 142L of the display R 142 and does not illuminate the upper half can be considered.

Thus, the display control device 100 can provide the driver with a rough estimate of the portion of the obstacle S that is hidden and the direction of movement thereof.

When there is no likelihood of collision with the vehicle 200 and an obstacle around the vehicle 200, the display control device 100 of the present embodiment displays only the interior view P5 (FIG. 7) or no display P6 (FIG. 8) on the display R 142 provided on the right side A-pillar 152.

If there is no possibility of collision of the vehicle 200 with an obstacle, regardless of whether or not the obstacle S is hidden by the right side A-pillar 152 when the front-right subject is viewed by the naked eye from the position of the driver's eyes, the driver does not need to pay particular attention to the obstacle. In this case, there is no need or a very low need to display the transparent view P2 of the obstacle area R' on the display R 142 provided on the right side A-pillar 152.

By not displaying the transparent view P2 when the need to display the obstacle S on the display R 142 is low, the display control device 100 of the present embodiment can reduce the chance of causing discomfort to the driver due to differences (position offset, color deviation, brightness deviation, and the like) between the visual based on the naked eye and the image displayed on the display R 142. This enables the display control device 100 to reduce annoyance felt by the driver due to frequent displaying of the transparent view P2.

By setting no display P6 that does not even display the interior view P5 when the need for displaying the transparent view P2 on the display R 142 is low, the display control device 100 enables reduction of power consumption of the display R 142 and thus achieves energy conservation. Reducing the power consumption of the display R 142 enables extending the life of the display R 142.

The display control device 100 of the present embodiment includes a collision likelihood determining part 20 and the collision likelihood determining part 20 performs collision likelihood determination processing (S5) and in the case that determination is made that collision is likely (case of YES in S6 of FIG. 12), performs blocking ratio calculation processing (S7), but the display control device of the present invention does not have to include a collision likelihood determining part.

A display control device of the present invention that does not include a collision likelihood determining part may perform obstacle blocking ratio calculation processing (S7) after obstacle presence determination processing (S4) in the blocked area identification processing (S3) and the display controlling part 60 may select display processing (S9 or S10) for the display R 142 according to the blocked area ratio calculated by the blocked area ratio calculating part 50 (S8).

The display control device 100 of the present embodiment sets switching ON/OFF of the power of the display control device 100 to automatically turn ON/OFF with the ON/OFF of the main power supply of the vehicle 200. However, the display control device according to the present invention may be set up to switch the power ON/OFF based on the intention of the driver by the driver performing a manual switch operation.

The display control device according to the present invention may be such that the power is ON when the vehicle speed of the vehicle 200 acquired from the vehicle information acquiring part 120 is low to only operate in the case that vehicle speed is low (for example, 30 [km/h] or lower) and then switch the power OFF when the vehicle speed of the vehicle 200 reaches a high speed that exceeds low speed.

In the case that the display control device according to the present invention includes a plurality of cameras acquiring images, with regards to the range where the obstacle capture range from the plurality of cameras overlaps, if one of the cameras for which capture range includes the overlapped range breaks or a lens thereof becomes dirty, the image displayed on the display R 142 or the display L 141 may be switched to an image of the camera in good condition based on the broken or dirty condition.

The display control device 100 of the present embodiment applies the right side A-pillar and the left side A-pillar as a vehicle body structure that blocks viewing of a subject by the naked eye of the driver sitting in the driver seat, but the vehicle body structure that blocks viewing of a subject by the naked eye of the driver sitting in the driver seat for the display control device according to the present invention is not limited to the right side A-pillar or the left side A-pillar, and may be applied to the hood, instrument panel, or door of the vehicle 200 as well.

As an application in a scenario of backing up a vehicle, the display control device according to the present invention can apply the left and right B pillars or C pillars as vehicle body structures that block viewing of a subject to the rear by the naked eye of a driver sitting in the driver seat.

For the determination results of the collision likelihood determining part 20, an example of two possibilities of the likelihood of there being a collision and no likelihood of a collision was described for the display control device 100 of the embodiment but the display control device according to the present invention may have stepped determination results such as numbers for the collision likelihood determination results. For example, the collision likelihood determining part 20 may calculate the likelihood of collision between the vehicle 200 and the obstacle S as a value from 0 to 100 [%] based on the vehicle 200 state and each obstacle S identified and in this case, the likelihood of collision of a predetermined value or higher is viewed as likelihood of collision, where the display controlling part 60 executes the obstacle blocking ratio calculation processing, and collision likelihood of lower than the predetermined value is viewed as no likelihood of collision, and the display controlling part 60 does not display the transparent view.

What is claimed is:

1. A display control device for controlling a displaying part, the displaying part provided on a structure of a vehicle body that hinders a field of view of a vehicle driver, and the display control device comprising:
   a processor; and
   a non-transitory computer-readable medium having stored thereon executable instructions that, when executed by the processor, cause the display control device to function as:
   an obstacle identifying part that is configured to identify an obstacle area that comprises an obstacle in an image acquired from an imaging part that captures images around a vehicle;
   a driver information acquiring part that is configured to acquire driver information regarding the field of view of the vehicle driver;
   a blocked area identifying part that is configured to identify a blocked area based on driver information where the field of view of the driver is blocked by the structure, and to convert the image captured by the imaging part into a driver's point of view image based on the driver information;
   a blocked area ratio calculating part that is configured to calculate a blocked area ratio, the blocked area ratio being a ratio of an area that the blocked area overlaps the obstacle area out of a total area of the obstacle area, and the blocked area ratio calculating part being configured to calculate the blocked area ratio based on a total area of the obstacle area in the driver's point of view image converted based on the driver information and an area of the obstacle area that overlaps the blocked area in the driver's point of view image; and
   a display controlling part that is configured to control the image displayed on the displaying part;
   wherein the display controlling part is configured to:
   control the displaying part to display a driver's point of view image obtained by converting a viewpoint of the image captured by the imaging part based on the driver information when the blocked area ratio is equal to a predetermined value or higher; and when the blocked area ratio is less than the predetermined value, determine that the obstacle is visible to the driver, switch a display process for the displaying part and control the displaying part not to display the driver's point of view image on the displaying part.

2. The display control device according to claim 1, wherein the executable instructions, when executed by the processor, cause the display control device to further function as a collision likelihood determining part that determines a likelihood of a collision of the vehicle with the obstacle based on a state of the vehicle and the obstacle identified by the obstacle identifying part, wherein the display controlling part displays the driver's point of view image on the displaying part based on the blocked area ratio and determination of the collision likelihood determining part when there is the likelihood of the collision and the blocked area ratio is equal to the predetermined value or higher, while the display controlling part does not display the driver's point of view image on the displaying part when there is the likelihood of the collision but the blocked area ratio is less than the predetermined value or when there is no likelihood of the collision.

3. The display control device according to claim 1, wherein the display controlling part is further configured to display a still image or not to display anything on the displaying part when the display controlling part does not display the driver's point of view image on the displaying part.

4. The display control device according to claim 1, wherein the display controlling part is further configured to perform a warning display on the displaying part when the blocked area is less than the predetermined value.

5. The display control device according to claim 4, wherein the display controlling part is further configured to perform the warning display on an edge of the displaying part corresponding to a side where the obstacle is blocked when the blocked area is less than the predetermined value.

* * * * *